(No Model.)
F. MOORE.
TRIPLE VALVE FOR AUTOMATIC BRAKE MECHANISM.
No. 453,154. Patented May 26, 1891.
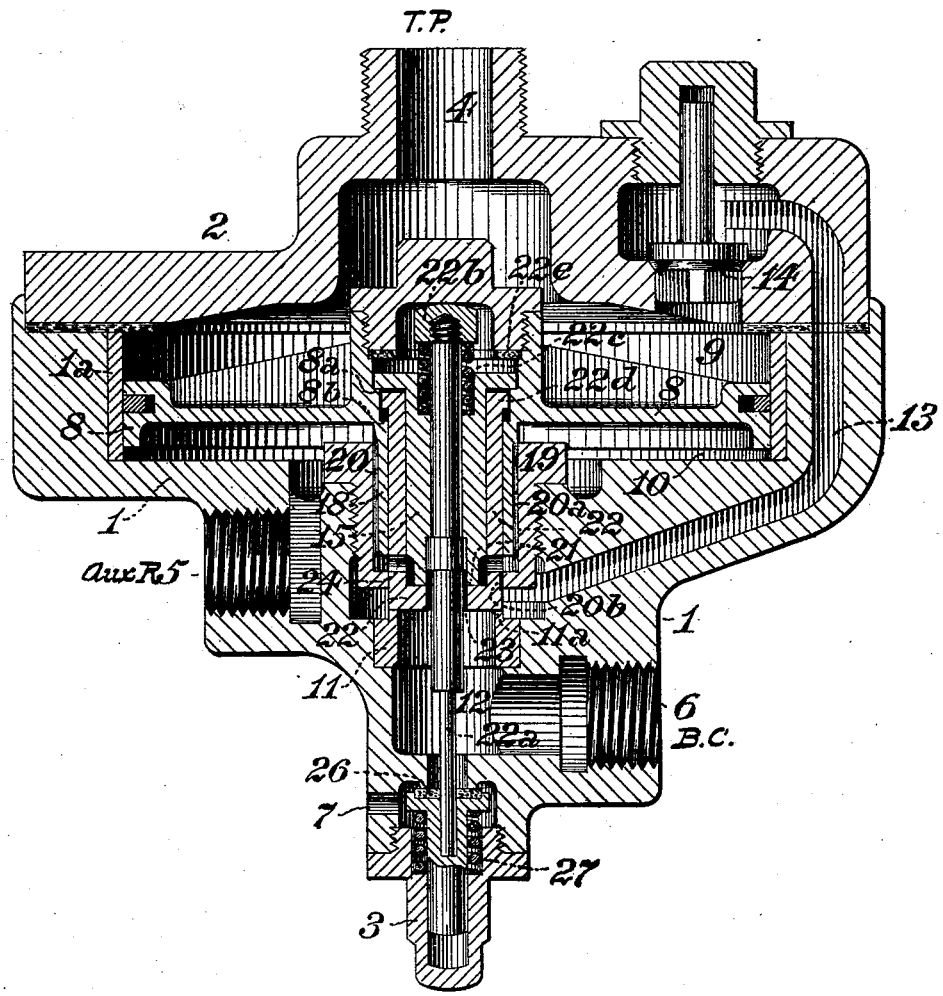

UNITED STATES PATENT OFFICE.

FRANK MOORE, OF PITTSBURG, PENNSYLVANIA, ASSIGNOR TO THE WESTINGHOUSE AIR BRAKE COMPANY, OF SAME PLACE.

TRIPLE VALVE FOR AUTOMATIC BRAKE MECHANISM.

SPECIFICATION forming part of Letters Patent No. 453,154, dated May 26, 1891.

Application filed December 20, 1890. Serial No. 375,336. (No model.)

*To all whom it may concern:*

Be it known that I, FRANK MOORE, a citizen of the United States, residing at Pittsburg, in the county of Allegheny and State of Pennsylvania, have invented or discovered a certain new and useful Improvement in Triple Valves for Automatic Brake Mechanisms, of which improvement the following is a specification.

My present invention relates to and is an improvement in triple valves of the class or type which is exemplified in Letters Patent of the United States Nos. 435,762 and 435,763, granted and issued to the Westinghouse Air Brake Company, as my assignee, under date of September 2, 1890.

The object of my invention is to provide a triple valve which shall embody the structural and operative advantages of those set forth in said Letters Patent, and which will further possess the capacity of operation as a "quick-action" valve for effecting the rapid and powerful application of brakes in making emergency stops.

To this end my invention, generally stated, consists in the combination of a casing, a movable abutment working therein, and two valves independently actuated by said abutment, said valves controlling communication through passages of larger and smaller transverse area, respectively, between a main air-pipe and auxiliary reservoir and a brake-cylinder, and also controlling communication between an auxiliary reservoir and a brake-cylinder and between a brake-cylinder and the atmosphere.

The improvement claimed is hereinafter fully set forth.

The accompanying drawing is a longitudinal central section through a triple valve embodying my invention.

In the practice of my invention I provide, as in Letters Patent Nos. 435,762 and 435,763 aforesaid, a valve-casing composed of a body 1, a cap-plate 2, and a bottom piece 3, which are suitably secured together, making tight joints. A nozzle 4 is formed upon the cap-plate 2 for the connection of a pipe leading to the main air or train pipe, and the body 1 is provided at different points in its length with lateral nozzles 5 6 for the connection of pipes leading to an auxiliary reservoir and to a brake-cylinder, respectively. An exhaust port or passage 7, leading from the interior of the body 1 to the atmosphere, is also formed in the body below the brake-cylinder connection 6.

The interior of the valve-casing is divided by a movable abutment 8, which in this instance is a suitably-packed piston fitted to work in a cylindrical bushing $1^a$, fixed in the upper portion of the body into two chambers or compartments 9 10, one of which 9 communicates directly with the train-pipe connection 4 and the other 10 with the auxiliary connection 5. A sleeve or bushing 11, the opening of which is normally closed by an annular valve-face on the lower end of a movable sleeve 22 and by a valve-face 21, to be presently described, is secured in the body 1 below the compartment 10 and separates said compartment from a lower compartment 12, which communicates directly with the brake-cylinder connection 6 and communicates, through an opening controlled by a discharge-valve 26, with the exhaust-passage 7. Communication is established between the train-pipe connection 4 and chamber 9 and the chamber 10 by a passage 13, extending through the cap and shell of the body, said passage being controlled by a check or non-return valve 14, which is adapted to seat on the cap-plate, closing in the direction of the train-pipe connection 4.

A tubular stem or sleeve 18 is formed or fixed centrally upon the lower side of the piston, said stem fitting truly in and, with the connected piston, being guided longitudinally by a bushing 19, fixed in the body 1. The stem 18 closes communication between the auxiliary reservoir connection 5 and the passage 13, leading to the train-pipe connection, except in so far as is in certain positions of the piston and stem permitted by a small lateral charging-groove 20, cut in the side of the stem, and a similar groove $20^b$, cut in the side of a bushing 22, to be presently described. The grooves 20 and $20^b$ serve to effect the supply of air from the train-pipe to the auxiliary reservoir when the brakes are released, and also serve in the application of the brakes to provide a passage for air from the auxiliary reservoir to the brake-cylinder, to further facilitate which one or more grooves 20ª, which are normally closed to the auxiliary reservoir connection, are cut in the periphery of the stem 18. The groove 20ᵇ supplies air from the main air or train pipe to the brake-cylinder in the graduated position of the parts for making service applications of the brakes, admitting air from the main air-pipes, while air from the auxiliary reservoir is admitted by the unseating of a valve-face 21, to be presently described. A bushing 22 is fitted truly in the tubular stem 18, said bushing having on its lower end an annular valve-face which seats upon a corresponding face 11ª on the top of the fixed bushing 11 and normally closes the opening thereof, except as to a central opening 23, which is formed in the bushing 22. A stem 22ª passes through the opening 23, the diameter of said stem being less than that of the opening, so that a small annular passage the area of which in transverse section is materially less than that of the passage 13, leading from the train-pipe connection, is provided between the stem 22ª and bushing 22. Said passage, through which the air is admitted to the brake-cylinder in making ordinary or service stops or applications of the brakes, is controlled by an annular valve-face 21, formed upon the lower end of a sleeve or bushing 15, which fits truly in the bushing 22 and around the stem 22ª, the bushing 15 having a flange or collar at its upper end, which rests upon and abuts against an annular shoulder or face 8ª on the piston 8 at the upper extremity of the bore of the stem 18, in which the bushing 22 is fitted. The admission of air from the auxiliary reservoir through the grooves 20 and 20ª and from the passage 13 through the groove 20ᵇ to the annular passage in the opening 23 is effected, when the valve-face 21 is raised from its seat, through lateral passages 24, extending from the periphery of the bushing 22 to an annular passage surrounding the valve-face 21 and its seat on said bushing. The stem 22ª passes freely through a central bore in the bushing 15, against which it abuts by a collar or shoulder a short distance above the valve-face 21, and is caused to move upwardly coincidently with the bushing 15 by a spring 22ᶜ, which abuts at one end against a face at the bottom of a central recess in the upper end of the bushing 15 and at the other against a nut 22ᵇ, engaging a thread on the upper end of the stem 22. The nut 22ᵇ abuts, on the release of the brakes, against a screw-cap, closing the central opening in the piston in which the upper flange of the bushing 15 works. Under such construction it will be seen that the stem 22ª will be elevated by the spring 22ᶜ coincidently with the elevation of the bushing 15 by the shoulder 8ª of the piston. In the downward movement of the piston the stem 22ª and bushing 15 will be coincidently depressed by the spring 22ᶜ until the movement of the bushing 15 is arrested by the seating of the lower valve-face of the bushing 22 on the face 11ª, after which continued downward movement of the piston 8 will effect further downward movement of the stem independently of the bushing 15 by the compression of the spring 22ᶜ. A collar 22ᵈ is formed upon the upper end of the bushing 22 in such position as in the upward traverse of the movable abutment to abut against a shoulder 8ᵇ on the stem 18 below the shoulder 8ª thereof. The discharge-valve 26, which controls a passage from the lower chamber 12 of the casing to the exhaust-port 7, is fixed upon a stem which is guided to move vertically in the bottom piece 3 in line with the stem 22ª, and the valve 26 is held normally to its seat by a spring 27. The lower end of the stem 22ª is normally in contact with, without exerting any substantial pressure upon, the stem of the discharge-valve 26 and unseats the same to effect the exhaust of air from the brake-cylinder when depressed below its normal position by the downward movement of the piston 8.

In operation air under pressure passes from the main air or train pipe through the nozzle 4, chamber 9, passage 13, charging-grooves 20ᵇ and 20, and nozzle 5 to the auxiliary reservoir, charging the latter and the chamber 10 below the abutment 8 to a pressure equal to that in the main air-pipe. The passage 23 and the central opening of the bushing 11 being meanwhile closed by the valve-face 21 of the bushing 15 and the lower valve-face of the bushing 22, air is prevented from passing to the brake-cylinder connection 6. When the pressure becomes equalized on opposite sides of the movable abutment 8, the spring 22ᶜ moves said abutment to its normal position. To prevent leakage of air between the stem 22ª and bushing 15, a packing-ring 22ᵉ is fixed in the upper end of the chamber in the abutment 8, which incloses the collar of the bushing 15, said packing-ring abutting against the top of the bushing 15 in the downward traverse of the abutment and preventing access of air to the space around the stem 22ª. To effect the application of the brakes in making ordinary or service stops, the engineer makes a slight reduction of pressure in the main air-pipe by discharging air therefrom through the engineer's brake-valve on the engine, and the then greater pressure in the auxiliary reservoir raises the movable abutment 8, which through the shoulder 8ª coincidently raises the bushing 15, unseating the valve-face 21 from its seat on the top of the annular passage 23, and thereby primarily affording a passage for air from the passage 13 and main air or train pipe through the charging-groove 20ᵇ, passages 24 and 23, chamber 12, and connection 6 to the brake-cylinder. This reduction of pressure in the passage 13 and compartment 9 causes a further upward movement of the abutment 8, which upward movement permits air to flow from the auxiliary reservoir and compartment 10 through the grooves 20ª, passages 24 and 23, chamber 12, and connection 6 to the brake-cylinder. The pressure of the air thus admitted applies the brakes through the piston of the brake-cylinder and the usual connections. The grooves 20$^a$, which are opened by the upward movement of the abutment 8, are much larger relatively to the capacity of the auxiliary reservoir than the charging-groove 20$^b$ is relatively to the capacity of the compartment 9 and the main air or train pipe communicating therewith. Consequently the reduction of pressure will be much quicker in the auxiliary reservoir and compartment 10 than in the passage 13, compartment 9, and main air or train pipe. A difference of pressure will thereby be established on the opposite sides of the abutment 8, causing a downward movement thereof, which will reseat the valve-face 21 on the top of the annular passage 23, thereby closing communication from the auxiliary reservoir and train-pipe to the brake-cylinder. The amount of air thus admitted to the brake-cylinder by each movement of the abutment and valve-face can be regulated or graduated to any desired degree by changing the relative proportions of the grooves 20$^a$ and 20$^b$. Each such movement of the abutment and valve-face effected by a slight opening and immediate closure of the engineer's valve admits a determined amount of air, as, say, in practice, two to four pounds, to the brake-cylinder, and if it be desired to admit more air at each movement this can be effected by increasing the duration of opening of the engineer's brake-valve, inasmuch as the abutment and valve will remain in raised position so long as the engineer's valve continues open. In order to apply the brakes with great rapidity and with their maximum available force, as in making "emergency" stops, a sudden and material reduction of pressure in the main air or train pipe is made by the engineer, such reduction causing the quick-action function of the appliance to be exerted by opening a passage for air to the brake-cylinder of substantially greater transverse sectional area than that through which air is supplied to the brake-cylinder in making ordinary or service stops. The quicker and greater reduction of pressure in the main air-pipe imparts a greater or the maximum upward traverse to the abutment 8, which, after unseating the valve-face 21, as before described, in its further upward movement unseats the valve-face at the bottom of the bushing 22 by the upward pressure of the shoulder 8$^b$ against the collar 22$^d$ on said bushing. The full area of the opening in the bushing 11, except so far as reduced by the stem 22$^a$, is thereby put in communication with the passage 13, leading from the main air-pipe connection, and with the auxiliary reservoir, thereby correspondingly increasing the rapidity and force with which the brakes are applied as compared with the results due to the supply of air through the comparatively small annular passage 23 in the operation of the valve in making service stops. The release of the brakes is effected by increasing the pressure in the main air or train pipe by readmitting compressed air thereto by the engineer's brake-valve and may be either total or partial, as circumstances may require. In service application it may be desirable in certain cases to effect only a partial release of the air in the brake-cylinders, which may be accomplished by admitting a comparatively small amount of air to the main air or train pipe by the engineer's brake-valve, and thereupon cutting off such supply of air. The small amount of air admitted causes the abutment 8 to move downwardly, and thereby to press the stem 22$^a$ against the stem of the discharge-valve 26 and unseat the latter, thereby establishing communication between the brake-cylinder connection 6 and exhaust-passage 7 and permitting a discharge of air from the brake-cylinder. The air admitted to the main air or train pipe is at the same time gradually flowing through the passage 13 and grooves 20$^b$ and 20 to the compartment 10 below the abutment 8. When the pressure has become equalized on the opposite sides of the abutment 8, the spring 22$^c$ returns the abutment 8 and stem 22$^a$ to normal position and allows the discharge-valve 26 to be closed by the spring 27, thereby closing communication between the brake-cylinder and the atmosphere. The amount of air discharged from the brake-cylinder for each admission of air by the engineer's brake-valve to the main air-pipe can be regulated as desired by the amount of air admitted, the greater the amount of air admitted the longer being the time required for the equalization of pressure on opposite sides of the abutment, and consequently the longer the duration of opening of the discharge-valve and the exhaust of air from the brake-cylinder. Complete release may be effected by permitting air to be admitted to the main air-pipe for a sufficiently long period. In the release of the brakes after emergency applications the first result of the downward movement of the abutment 8, due to the admission of air by the engineer's brake-valve, is to move the stems 18 and 22$^a$ and bushing 15 downwardly, closing communication between the main air-pipe and the chamber 10 and auxiliary reservoir connection 5, other than as to the small charging-groove 20, by the closure of the grooves 20$^a$ and closing communication between the main air-pipe and auxiliary reservoir connection and the brake-cylinder connection 6 by the seating of the valve-face 21. The continued downward movement of the abutment unseats the discharge-valve and opens a passage for the exhaust of air from the brake-cylinder, as before described.

I claim as my invention and desire to secure by Letters Patent—

1. The combination of a valve-casing, a movable abutment working therein, a valve actuated by said abutment in its preliminary traverse and controlling communication between an auxiliary reservoir and main air-pipe and a brake-cylinder, and a valve actuated by further traverse of the abutment and controlling communication between the auxiliary reservoir and main air-pipe and the brake-cylinder through a passage of greater transverse area than that which is opened in the preliminary traverse of the abutment, substantially as set forth.

2. The combination of a valve-casing, a movable abutment working therein, a valve actuated by engagement with said abutment and controlling communication between an auxiliary reservoir and main air-pipe and a brake-cylinder through a passage of comparatively small transverse area, a valve-controlling communication between the auxiliary reservoir and main air-pipe and the brake-cylinder through a passage of comparatively large transverse area, and a connection coupling said valves with the capacity of independent and successive opening movement, substantially as set forth.

3. The combination of a valve-casing, a movable abutment working therein and having a tubular central stem controlling communication between a main air-pipe connection and an auxiliary reservoir-connection, a bushing fitting in said stem and having on one end a flange adapted to be engaged by a shoulder on the abutment and at the other end a valve-face controlling communication between a main air-pipe passage and the auxiliary reservoir-connection and a brake-cylinder connection through a passage of comparatively large transverse area, a bushing fitting in the bushing first specified and having at one end a valve-face controlling communication through a passsage of comparatively small transverse area in said first-specified bushing and at the other end a flange adapted to be engaged by a shoulder on the abutment, a stem passing centrally and freely through both bushings, a cap or plate by which pressure is applied to said stem in one direction from the abutment, and a spring by which pressure is applied to said stem in the opposite direction from the abutment first specified, substantially as set forth.

In testimony whereof I have hereunto set my hand.

FRANK MOORE.

Witnesses:
  J. SNOWDEN BELL,
  R. H. WHITTLESEY.